US009348536B1

(12) United States Patent
Yoon et al.

(10) Patent No.: US 9,348,536 B1
(45) Date of Patent: *May 24, 2016

(54) FLEXIBLE SEQUENCE DESIGN ARCHITECTURE FOR SOLID STATE MEMORY CONTROLLER

(71) Applicant: Marvell International Ltd., Hamilton (BM)

(72) Inventors: Tony Yoon, Cupertino, CA (US); Hyunsuk Shin, San Jose, CA (US); Chi Kong Lee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,680

(22) Filed: Dec. 17, 2013

Related U.S. Application Data (63) Continuation of application No. 13/595,616, filed on Aug. 27, 2012, now Pat. No. 8,626,995, which is a continuation of application No. 12/569,089, filed on Sep. 29, 2009, now Pat. No. 8,255,615.

(60) Provisional application No. 61/143,386, filed on Jan. 8, 2009.

(51) Int. Cl.
| | |
|---|---|
| *G06F 13/00* | (2006.01) |
| *G06F 3/06* | (2006.01) |
| *G06F 11/10* | (2006.01) |
| *G06F 13/16* | (2006.01) |
| *G06F 12/02* | (2006.01) |

(52) U.S. Cl.
CPC .............. *G06F 3/0659* (2013.01); *G06F 3/061* (2013.01); *G06F 3/0688* (2013.01); *G06F 11/1068* (2013.01); *G06F 13/1689* (2013.01); *G06F 12/0246* (2013.01)

(58) Field of Classification Search
CPC ........................ G06F 12/0246; G06F 13/1689
USPC ........................................... 711/103, 156, 167
See application file for complete search history.

(56) References Cited

U.S. PATENT DOCUMENTS

| | | | |
|---|---|---|---|
| 5,519,847 A | 5/1996 | Fandrich | |
| 7,930,470 B2 | 4/2011 | Brittain et al. | |
| 8,255,615 B1* | 8/2012 | Yoon et al. ..................... | 711/103 |

(Continued)

FOREIGN PATENT DOCUMENTS

| | | |
|---|---|---|
| WO | 0028418 | 5/2000 |
| WO | 2005098623 | 10/2005 |

OTHER PUBLICATIONS

Bai, Lingfei, Authorized Officer, The International Bureau of WIPO, International Preliminary Report on Patentability, PCT Application No. PCT/US2011/065913, Jul. 4, 2013, 10 pages.

(Continued)

*Primary Examiner* — Than Nguyen (57) ABSTRACT

In some implementations, a method includes receiving information in a storage device controller from one or more storage devices in a solid state drive system over one or more channels; and for information received over each of the one or more channels, determining whether a condition for sending the information received over the channel to a host device is satisfied, and sending the information received over the channel to the host device when the condition for sending the information is satisfied.

21 Claims, 4 Drawing Sheets

(56) References Cited

U.S. PATENT DOCUMENTS

| | | |
|---|---|---|
| 8,626,995 B1* | 1/2014 | Yoon et al. ............. 711/103 |
| 2002/0004878 A1* | 1/2002 | Norman ............. 711/103 |
| 2002/0026600 A1 | 2/2002 | Jung |
| 2002/0174297 A1* | 11/2002 | McDonald et al. ........ 711/114 |
| 2003/0191912 A1 | 10/2003 | Dortu |
| 2004/0044933 A1* | 3/2004 | Jeddeloh ............. 714/718 |
| 2004/0187122 A1 | 9/2004 | Gosalia et al. |
| 2005/0018527 A1 | 1/2005 | Gorobets |
| 2006/0126390 A1 | 6/2006 | Gorobets |
| 2007/0061538 A1 | 3/2007 | Chang |
| 2008/0049513 A1 | 2/2008 | Jeong |
| 2008/0055993 A1 | 3/2008 | Lee |
| 2008/0101120 A1 | 5/2008 | Park |
| 2008/0144381 A1 | 6/2008 | Kang |
| 2009/0077305 A1 | 3/2009 | Shin et al. |
| 2009/0089492 A1 | 4/2009 | Yoon |
| 2009/0106509 A1* | 4/2009 | Shim et al. ............. 711/154 |
| 2009/0172264 A1 | 7/2009 | Chung et al. |
| 2010/0043009 A1 | 2/2010 | Marchand |
| 2010/0058003 A1* | 3/2010 | Goto et al. ............. 711/154 |
| 2011/0145474 A1 | 6/2011 | Intrater |
| 2012/0159052 A1 | 6/2012 | Lee |

OTHER PUBLICATIONS

Eich, Martine, Authorized Officer, European Patent Office, International Search Report and Written Opinion, PCT Application No. PCT/US2011/065913, Aug. 8, 2012, 14 pages.

Wikipedia entry for "IEEE 1394 Interface", [online] Retrieved from the Internet<URL:http://en.wikipedia.org/IEEE_1394_interface>, [retrieved on Sep. 24, 2009], 9 pages.

International Search Report and Written Opinion, dated Jan. 4, 2010, issued in International Application No. PCT/US2009/055632.

Office Action and translation, Taiwanese Patent Application No. 98129668, issued Jun. 5, 2014, 17 pages.

* cited by examiner

FLEXIBLE SEQUENCE DESIGN ARCHITECTURE FOR SOLID STATE MEMORY CONTROLLER

TECHNICAL FIELD

This application is a continuation of U.S. patent application Ser. No. 13/595,616, filed Aug. 27, 2012, which is a continuation of U.S. patent application Ser. No. 12/569,089, filed Sep. 29, 2009, issued on Aug. 28, 2012, as U.S. Pat. No. 8,255,615, which claims the benefit of U.S. Provisional Patent Application No. 61/143,386, entitled "Flexible Sequence Design Architecture for Solid State Memory Controller," filed Jan. 8, 2009, the disclosures of which are hereby expressly incorporated herein. The subject matter of this application is generally related to memory management.

BACKGROUND

Many electronic devices include embedded systems to control the operation of the underlying devices and to provide enhanced functionality and operational flexibility. Typically, non-volatile memory is included as a portion of the embedded system to store operating system program code, issued commands and critical data for operating the embedded system. Recently, embedded systems have begun to use solid state memory as non- volatile memory (e.g., electrically Erasable Read Only Memory (EEPROM)). Solid state memory may be used to accelerate applications to increase data access time, and may be advantageously programmed or re-programmed to provide non-volatile storage of information.

Conventionally, internal firmware may be used for issuing commands to non-volatile memory. The process typically requires that the firmware issue one command at a time to the non-volatile memory before a next command can be issued. Specifically, the firmware may send a status inquiry to a flash memory device to check on the status with respect to the command. If the command is still in the process of completion, the firmware waits to receive the result before a next command can be issued. In this conventional process, the firmware is on standby at all times. Because the firmware is on standby, the firmware cannot process other commands or requests until the processing of the previous command is complete. Additionally, the delay associated with the standby cycle to receive the status of a given command increases the latency of the associated device, the effect of which can become pronounced when numerous commands are in a queue.

SUMMARY

Methods, systems and computer program products for sending one or more commands to one or more flash memory devices using a solid state controller and receiving information associated with the commands from the flash memory devices are described. In some implementations, the solid state controller includes a sequencer to forward the commands to the flash memory devices on behalf of the firmware.

In some implementations, a method can be used that includes receiving a command from a host, identifying one or more parameters in the received command, transmitting the command to a flash memory device, receiving information associated with the command from the flash memory device, and communicating the received information to the host when the identified parameters include a request to receive the information from the flash memory device.

In some implementations, a system can be used that includes a host to issue one or more commands, and a controller including a processor with embedded firmware to receive the issued commands; and a sequencer to send the received commands to one or more flash memory devices and to receive information associated with the commands from the flash memory devices, the sequencer configured to communicate the information to the host if transmission parameters in a respective command include a request to receive the information from the respective flash memory device.

In some implementations, a computer-readable medium can be used that includes instructions stored thereon, which, when executed by a processor, causes the processor to perform operations including receiving a command from a host, identifying one or more parameters in the received command, transmitting the command to a flash memory device, receiving information associated with the command from the flash memory device, and communicating the received information to the host when the identified parameters include a request to receive the information from the flash memory device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Flash Memory Overview

Figure 1:
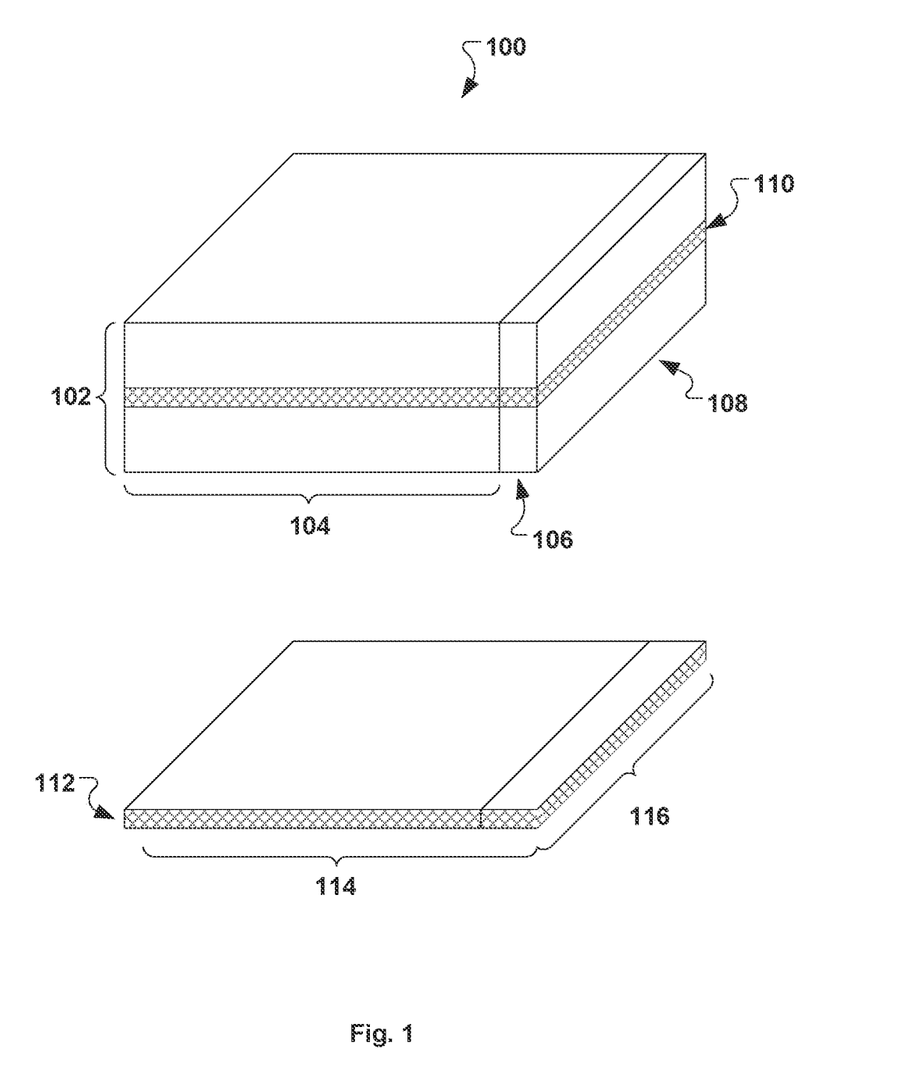
FIG. 1 shoves a block diagram of an embodiment of a flash memory device.

Flash memory devices, such as flash electrically erasable programmable read only memory (EEPROM), are used in jump drives, memory cards, and other nonvolatile memory applications associated with cameras, video games, computers, and other electronic devices. FIG. 1 shows a block diagram of a flash memory device 100

As shown in FIG. 1, the flash memory device 100 may be organized in bits. For example, the memory device 100 may be of the form of an array that includes 8-bits in depth 108. The flash memory device 100 also may be organized in bytes. For example, the flash memory device 100 may include a portion 104 containing 2K bytes, and a portion 106 containing 64 bytes. The flash memory device 100 further may be organized into pages. For example, the flash memory device 100 may include 512K pages 110 A single page 112 may be organized into two portions which may include portion 104 and portion 106 as a first portion, and a second portion 116. The second portion 116 may correspond to an eight-bit wide data input/output (I/O) path (e.g., I/O [0]-I/O [7]). Even further, the flash memory device 100 may be arranged in blocks.

For example, the flash memory device 100 may include a block 102, which equals to 64 pages. The block may be sized to store one sector of user data and overhead data including information such as, without limitation, an error correction code (ECC) associated with the user data, a history of use of the block, defects and other physical information of the memory cell. The flash memory device 100 may be formed using the foregoing bits, bytes, pages and blocks.

In some implementations, the flash memory device may be a "NAND" type flash memory. NAND flash memory generally has faster erase and program times, higher density, lower cost per bit, and more endurance than, for example, NOR-type flash memory. NAND flash memory may utilize series strings of more than two memory cells, such as 16 or 32, connected along with one or more select transistors between individual bit lines and a reference potential to form columns of cells. Word lines may extend across cells within such columns. An individual cell within a column may be read and verified during programming by causing the remaining cells in the string to be turned on so that the current flowing through a string may be dependent upon the level of charge stored in the addressed cell.

A NAND flash I/O interface may be used for communicating with a NAND memory, and may allow only sequential access to data stored in the NAND flash memory. The NAND flash I/O interface may include multiple pins each corresponding to a specific function. While only NAND flash memory has been described, it should be noted that other memory types also may be used, such as, without limitation, NOR flash EEPROM, AND flash EEPROM, DiNOR flash EEPROM, serial flash EEPROM, DRAM, SRAM, ROM, EPROM, FRAM, MRAM, and PCRAM.

Solid State Drive System

Figure 2:
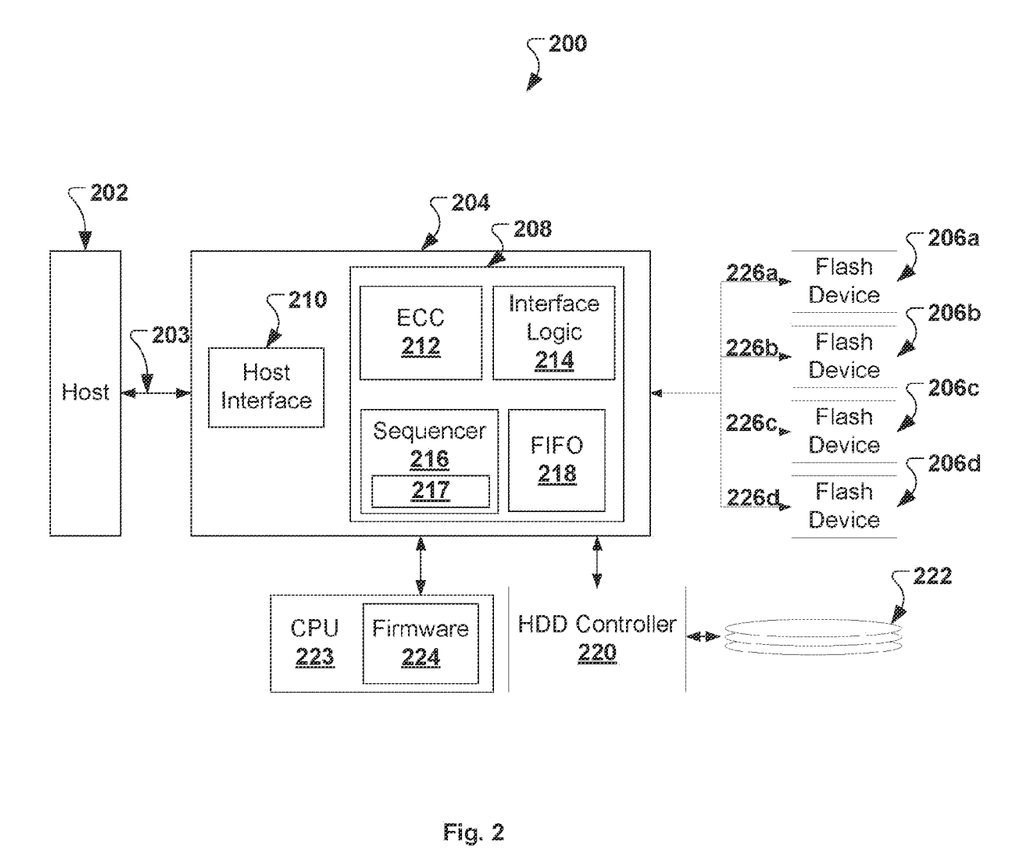
FIG. 2 shows an embodiment of a solid state drive system that includes one or more flash memory devices shown in FIG. 1.

FIG. 2 shows an embodiment of a solid state drive system 200 that includes one or more flash memory devices 100, such as that shown in FIG. 1. As shown in FIG. 2, the system 200 includes a host 202 that communicates with a solid state drive 204 through a host interface 210. The host interface 210, in some implementations, may include a Serial Advanced Technology Attachment (SATA) interface or a Parallel Advanced Technology Attachment (PATA) interface. A SATA interface or PATA interface may be used to convert serial or parallel data into parallel or serial data, respectively. For example, if the host interface 210 includes a SATA interface, then the SATA interface may receive serial data transferred from the host 202 through a bus 203 (e.g., a SATA bus), and convert the received serial data into parallel data. In other implementations, the host interface 210 may include a hybrid interface. In these implementations, the hybrid interface may be used in conjunction with, for example, a serial interface.

The host interface 210, in some implementations, may include one or more registers in which operating commands and addresses from the host 202 may be temporarily stored. The host interface 210 may communicate a write or read operation to a solid state controller 208 in response to the stored information in the register(s).

In some implementations, the solid state drive 204 may support one or more channels (e.g., eight channels), and each channel may be configured to receive one or more control signals (e.g., four chip enable signals) to accommodate more than one command pending in an internal command queue 217, as will be discussed in greater detail below.

Flash Memory Device

Each flash memory device 206, in some implementations, may include a nonvolatile memory (e.g., a single-level flash memory or a multi-level flash memory). In some implementations, the nonvolatile memory may include a NAND-type flash memory module. A NAND-type flash memory module may include a command/address/data multiplexed interface such that commands, data, and addresses may be provided through corresponding input/output pins.

In some implementations, each flash memory device may be connected to a channel 226. Each channel may support, for example, one or more input and output lines, chip select signal lines, chip enable signal lines and the like. The channel also may support other signal lines such as write enable, read enable, read/busy output, and reset signal lines. In some implementations, the flash memory devices 206a-206d may share a common channel. In other implementations, to increase the degree of parallelism, each flash-memory device may have its own channel connected to the solid state drive 204. For example, flash memory device 206a may be connected to the solid state drive 204 using channel 226a; flash memory device 206b may be connected to the solid state drive 204 using channel 226b; flash memory device 206c may be connected to the solid state drive 204 using channel 226c; and, flash memory device 206d may be connected to the solid state drive 204 using channel 226d.

In some implementations, the flash memory devices 206a-206d may be detachable. In some implementations, the flash memory devices 206a-206d may be connected to the solid state drive 204 using standard connectors. Examples of standard connectors may include, without limitations, SATA, USB (Universal Serial Bus), SCSI (Small Computer System Interface), PCMCIA (Personal Computer Memory Card International Association), and IEEE-1394 (Firewire).

In some implementations, each flash memory device 206 may include one or more solid state storage elements arranged in a bank. A solid state storage element may be partitioned into pages. In some implementations, a solid state storage element may have a capacity of 2000 bytes (i.e., one page). A solid state storage element, in some implementations, may include two registers to provide a total capacity of 4000 bytes (i.e., 4 kB).

In some implementations, each flash memory device 206 also may include one or more banks each being selected using a chip enable signal or chip select signal. The chip enable or chip select signal may select one or more solid state storage elements in response to a host command.

In some implementations, each solid state storage element may include one or more single-level cell ("SLC") devices. In some implementations, each sold state storage element may include one or more multi-level cell ("MLC") devices. The SLC or MLC devices may be selected using a chip enable signal or chip select signal, which may be generated by the controller 208 using a combination of control and address information received from the host 202.

Where multiple banks are used, in some implementations, the solid state drive 208 may access more than one bank in a same flash memory device at the same time. In some implementations, the solid state drive 208 may access different banks in different flash memory devices at the same time. The capability to access more than one bank allows the solid state drive 204 to fully utilize the available resources and channels 226a-226d to increase the overall performance of the solid state drive 204. Furthermore, where the flash memory devices 206a-206d share a same memory input/output line and control signal (e.g., chip enable signal), the number of pins of the controller 208 may be reduced to further minimize the cost for manufacturing the solid state drive 204.

Solid State Controller

The solid state controller 208 receives one or more service requests or commands (e.g., read and program requests). The controller 208 may be configured to handle any command, status, or control request for access to the flash memory devices 206a-206d. For example, the controller 208 may be configured to manage and control storage and retrieval of data in the flash memory devices 206a-206d.

In some implementations, the controller 208 may be a part of a microcomputer system under the control of a microprocessor(not shown). The controller 208 may control the flow of commands and data between the host 202 and the solid state drive 204. In some implementations, the controller 208 may include read-only memory (ROM), random access memory (RAM) and other internal circuits. The controller 208, in some implementations, may be configured to support various functions associated with the flash memory devices 206, such as, without limitation, diagnosing the flash memory devices 206, sending commands (e.g., activation, read, program, erase, pre-charge and refresh commands) to flash memory devices 206, and receiving status from the flash memory devices 206. The controller 208 may be formed on a different chip as the flash memory devices 206a-206d (e.g., formed on a same chip as the solid state drive 204) or on a same chip.

As shown in FIG. 2, the controller 208 may include an error checking code (ECC) 212, interface logic 214, a sequencer 216 and a first-in-first-out (FIFO) 218. In some implementations, the solid state drive 204 may include a central processor unit (CPU) 223 with embedded firmware 224 by which the controller 208 may be controlled. The CPU 223 may include a microprocessor, a signal processor (e.g., a digital signal processor) or microcontroller. In some implementations, the CPU 223 with the embedded firmware 224 may reside outside of the solid state drive 204.

In some implementations, the solid state drive 204 also may be connected to a hard disk drive (HDD) controller 220 for controlling one or more hard disks 222. In some implementations, the HDD controller 220 may be used in conjunction with the controller 208 to manage and control the flash memory devices and the hard disks 222 to maximize the storage capacity of the solid state system 200.

Interface Logic Module

The interface logic 214 may send commands, address and control information from the controller 208 to the flash memory devices 206a-206d. The interface logic 214 also may relay command status from the flash memory devices 206a-206d to the controller 208.

In some implementations, the interface logic 214 may be configured to support NAND-type flash memory and NOR-type flash memory. The interface logic 214 may communicate with the flash memory devices 206a-206d through channels 226a-226d. Where different types of flash memory devices are used (e.g., NAND memories and NOR memories), channels 226a-226d may be connected to the same or different types of memories. In some implementations, when read or program operations are carried out to different channels, the interface logic 214 may selectively perform, for example, software and hardware interleave operations. In other implementations, the interface logic 214 also can handle read and program operations for different channels concurrently.

In some implementations, the interface logic 214 may include, without limitation, one or more data ports, signal detectors, encoders, decoders, interleavers, de-interleavers, comparators and the like. The interface logic 214 may serve as an interface between the controller 208 and the flash memory devices 206a-206d for clocks, data masks, strobes, rank selects, memory address, memory commands, and read and program data. Where SLC or MLC devices (e.g., to store block and page buffers of data) are included in the flash memory devices 206a-206d, the interface logic 214 may provide a lower-level memory interface for communicating with the SLC/MLC devices.

FIFO

The FIFO 218 may operate using a first-in-first-out scheme, and may be configured to output data in a same order that is received (e.g., to output data that is received first). In some implementations, the FIFO 218 may include one or more registers each with a capacity of more than a virtual page of data segments. The FIFO 218 may be used to temporarily store data and commands that have not been processed while being transferred, for example, to the sequencer 216 and the flash memory devices 206 for execution. In some implementations, the EEC 212 and/or the interface logic 214 can utilize the FIFO 218 to buffer data transfer between the host 202 and the flash memory devices 206, and to provide error correction for data received from or transmitted to the flash memory devices 206. In some implementations, the FIFO 218 also can include an internal command queue (e.g., separate from internal command queue 217) through which the sequencer 216 can store commands or control signals for commanding or controlling the flash memory devices 206. The same or different internal command queue also can be used to store header and/or internal data between the embedded firmware (e.g., firmware 224) and the flash memory devices 206.

In some implementations, the FIFO 218 may generate data and control signals for transferring data to and receiving data from the controller 208 through, for example, an internal command queue 217 (as will be discussed below in greater detail) of the sequencer 216. The FIFO 218 may determine the transfer direction of the data stored in the internal command queue 217 based on, for example, commands from the host, the sequencer 204 or the flash memory devices 206a-206d.

In some implementations, data processed by the ECC 212 may be stored in the FIFO 218. In some implementations, the ECC 212 may release each data block stored in the FIFO 218 for code correction. Specifically, when the ECC 212 identifies errors in the data, correction may be applied to the data. The corrected data block may then be transferred from the FIFO 218 to a flash memory device selected by the sequencer 216 based on the command received from the host 202 after the ECC process on the data block is complete.

Error Correction Code

The flash memory devices 206a-206d are susceptible to defects and failures. A number of factors may give rise to such errors, including, for example, the gradual shifting of the threshold level of the memory states as a result of ambient conditions, stress from normal operations including programming, erasure, read operations and the like. Other errors may be contributed by, for example, a failing memory bit or bits in a flash device, faulty transmission to and from a flash device and the like. Thus, to prevent errors during operation, in some implementations, ECC 212 may be included in the controller 208 to ensure data integrity of the solid state drive system 200. The ECC 212 may be configured to detect and correct data failures caused by, for example, soft errors and hard errors at read, erase or program time In some implementations, the ECC 212 may be used for checking and correcting errors associated with the data and commands stored in the internal command queue 217 of the sequencer 216 prior to being sent to the flash memory devices 206. Additionally, the ECC 212 also may be used for checking and correcting errors associated with the data transmitted to and received from the flash memory devices 206. For example, when data (e.g., a status command) is transferred from a flash memory device to the controller 208, the ECC 212 may execute an error detecting operation to ensure the integrity of the transferred data. If an error is detected among the transferred data, the ECC 212 may promptly request error correction from the controller 208 and subsequently perform data correction. The corrected data may then be sent to the sequencer 216 for further processing.

As an example operation, a read request may be queued by the sequencer 216 (as will be discussed in greater detail below) and sent to a flash memory device 206. The data may then be returned from the flash memory device 206 to the ECC 212. The ECC 212 may check the returned data for errors. If an error is detected but the error correction is disabled, then an error notification may be sent to the sequencer 216 in place of the data expected. The error notification may include an error report indicating that a data has occurred. The failed location may then be disabled by moving the address of that location to a failed map. The routine may resume and wait for a next request. If the ECC 212 detects an error and the correction function is enabled, the failed data may be corrected, verified and forwarded to the sequencer 216.

In some implementations, the controller 204 may generate redundant bits (e.g., parity bits) that may be appended to the data sectors during program operations. For example, a 512-byte data sector may include 16 bytes of ECC data appended, resulting in a 528-byte page. During read operations, the redundant data represented in the 16 bytes of ECC data may be utilized to detect and correct errors in the data read out from the flash memory device 206.

In some implementations, the ECC 212 also may be configured to detect and correct errors in the data flowing between the host 202 and the solid state device 204. The ECC 212 may implement an error correction scheme including cyclic redundancy check (CRC), and parity and forward error correction (FEC) when checking and correcting errors.

Sequencer

In some implementations, the sequencer 216 may be used to carry out the commands on behalf of the firmware 224. The sequencer 216 may control, for example, an access process of writing to and or reading from one or more data sectors of the flash memory devices 206a-206d.

In some implementations, the sequencer 216 may store the commands received from the firmware 224 (or the host 202) in an internal command queue 217. The internal command queue 217 allows the controller 208 to perform multiple-block data access. In some implementations, the flash memory device (e.g., flash memory device 206a-d) includes a 512-byte page register built-in such that when data write to the flash memory device is performed, the data is written to the page register first before being written to the flash memory cell. Conventional flash controllers control the flash memory access cycles by transferring one single block (512 bytes) of data to the page register of the flash memory device at a time. Thus, no other access to the flash memory device is allowed once the 512-byte page register is filled. Consequently, the conventional flash controllers, which use a single-block data access methodology, limit the performance of storing and retrieving data to and from the flash memory devices.

The internal command queue 217 may store one or more pending commands. In some implementations, the internal command queue 217 may have a capacity suited to store thirty-two commands each representing one page of information. The host 202 may send multiple commands each containing unique data simultaneously to the controller 208, and the controller 208 may store such commands in the internal command queue 217 for simultaneous or sequential transmission to the flash memory devices 206a-206d. Unlike the conventional single-block data-transfer controllers which transfer a single data block at a time, the controller 208, which the sequencer 216 and the internal command queue 217, allows more than one command to be sent to the flash memory devices 206a-206d, thus improving the data performance significantly.

As an example, the host 202 may issue a read command, and send the read command to the sequencer 216. When the sequencer 216 receives the read command, the sequencer 216 may place the command in the internal command queue 217. The sequencer 216 then may identify the flash memory device to which the command is to be sent, and the address of the identified flash memory device at which data is to be read. After verifying that the identified flash memory device may be accessed at the address, the sequencer 216 may gate the address and the command to the identified flash memory device by selecting the identified flash memory device using a chip enable (or chip select) signal, and sending the address and the command out to the selected flash memory device. Upon receiving the read command (or a control signal indicating the read command) from the sequencer 216, the identified flash memory device may process the read command, and subsequently send serial data or command status information back to the sequencer 216. This process may continue until the last bit of the addressed data has been transmitted by the identified flash device and received by the sequencer 216.

In some implementations, the data received from the identified flash memory device may first be stored in the FIFO 218. If the data transmitted by the identified flash memory device contains a bad bit, the bad bit/bits may be replaced by a corrected bit/bits before sending the data to the sequencer 216. Alternatively, the data received from the identified flash memory device may be sent to the sequencer 216, after which the data is forwarded to the FIFO 218 to be sent out to the host 202. While the data waits in the FIFO 218, ECC processing may be performed on the data. After the command or sets of commands have been executed, the sequencer 216 may load a next command or set of commands in the internal command queue 217 for processing.

Similarly, when the host 202 issues a program command, the sequencer 216 may fetch the write data from the firmware 224 (or from the host 202). The firmware 224 may be embedded in the CPU 223 of the solid state drive 204 used for controlling the controller 208. Upon receipt of the data, the sequencer 216 may request the ECC 212 to perform an ECC error correction procedure. this allows errors that arise during transmissions to be detected and corrected prior to being written into the identified flash memory device. The write data may be stored in the FIFO 218 while an ECC error correction procedure is performed, and subsequently routed to the designated flash device after correction.

In some implementations, data (e.g., which may include command, address and control information) may be formatted into serial data prior to being sent to the flash memory devices 206a-206d. A pipeline architecture also may be used to provide efficient throughput as the data is gated from interface logic 214 to the identified flash memory device. The data gated out of the interface logic 214, in some implementations, may first be verified prior to being sent to the identified flash memory device. After the data has been loaded into the identified flash memory device, the flash memory device may process the data including the command.

In some implementations, the sequencer 216 may execute each command on a rolling basis (e.g., Execute each command as it is received). in other implementations, the sequencer 216 may determine whether the internal command queue 217 is full or nearly full (e.g., included a predetermined number of commands). In some implementations, when the internal command queue 217 is full or nearly full, the sequencer 216 may execute the commands simultaneously (e.g., all of the pending commands currently stored in the command queue 217 simultaneously).

For example, assuming that the internal command queue 217 can accommodate thirty-two commands, the sequencer 216 may monitor the internal command queue 217 to determine whether there are thirty two pending commands stored in the internal command queue 217. If there are thirty two pending commands, the sequencer 216 may execute all thirty two commands at the same time, and report the status of each executed command to the firmware 224 as the request associated with the command is being fulfilled. In some implementations, the sequencer 216 can issue one or more commands or control signals to the interface logic 214 such that the channels 220a-226d can begin the data transfer process simultaneously.

Upon receiving one or more commands from the sequencer 216, the selected flash devices may perform the requested operations (e.g., read or program operations) associated with the commands. In some implementations, the firmware 224 need not poll the status of a command as the command is being carried out. In these implementations, the flash memory devices 206a-206d may forward command status information to the sequencer 216 through the interface logic 214, which may trigger an interrupt routine. When the interrupt routine is triggered, an interrupt (or other form of a message) may be sent to the firmware 224 to notify the firmware 224 of the command status information.

Figure 3:
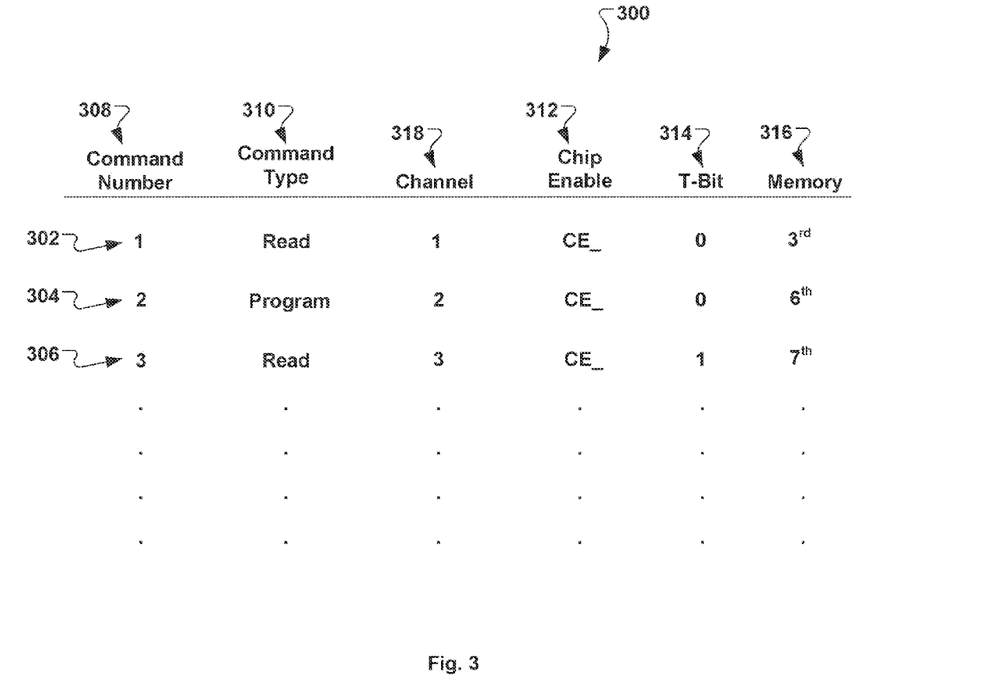
FIG. 3 shows an embodiment of an internal command queue with multiple pending commands each containing T-bits of information.

In some implementations, the sequencer 216 may report the status of a command to the firmware 224 in real time as the status is being sent from the corresponding flash memory device. In some implementations, the sequencer 216 may be configured so that the sequencer 216 reports the command status only when a specific condition is met. The specific condition may include an error detection, an error correction, a program delay and the like. In some implementations, the specific condition may depend on the information supplied by a T-bit in the command. FIG. 3 illustrates an example internal command queue 300 with multiple pending commands each containing T-bit information.

As shown in FIG. 3, a command 302 is currently stored in the internal command queue 300 to be executed. The command 302 may be received, for example, from the host 202. Each command may include information associated with a command number field 308, a command type field 310, a channel field 318, a chip enable field 312, a T-Bit field 314 and a memory field 316.

The command number field 308 may be used to indicate the number of commands currently stored in the internal command queue 300. The command type field 310 may indicate the type of command associated with each command. For example, command 302 has a command type "read", which indicates that command 302 is a read command. As another example, command 304 has a command type "program", which indicates that command 304 is a program command.

The channel field 318 may define the channel (e.g., one of channels 226a-226d) through which the corresponding command is to be sent. As an example, command 302 is to be sent to the $3^{rd}$ flash memory device (as indicated in the memory field 316) in an array of flash memory devices through channel "1". As yet another example, command 306 is to be sent to the $7^{th}$ flash memory device through channel "3".

In some implementations, the firmware 224 may define the T-bit information of the T-bit field 314 for each command. In some implementations, the T-bit information serves as an indicator as to whether an interrupt routine for notifying the firmware 224 of command status information is to be triggered. For example, as shown in FIG. 3, the firmware 224 may designate the T-bit field 314 of command 306 as "1", indicating that the sequencer 216 is to send an interrupt to the firmware 224 when the status associated with command 306 is available from the $7^{th}$ flash memory device. As another example, the firmware 224 may designate the T-bit field 314 of command 302 as "0", indicating that the sequencer 216 need not send an interrupt to the firmware 224 when the status associated with command 302 is available from the $3^{rd}$ flash memory device. Similarly, the firmware 224 may designate the T-bit field 314 of command 304 as "0", indicating that the sequencer 216 need not send interrupt to the firmware 224 when the status associated with command 304 is available from the $6^{th}$ flash memory device. The T-bit field 314, in general, may provide the firmware 224 the flexibility to define when and how often the firmware 224 is to be called upon so that unnecessary computing resources and latency associated with receiving status information may be reduced to a minimum.

In some implementations, the firmware 224 may provide the T-bit information together with the commands received from the host 202 to the sequencer 216. In other implementations, the firmware 224 may provide the T-bit information and the commands received from the host 202 to the sequencer 216 separately.

The sequencer 216 may facilitate the overall processing of the pending commands including, without limitation, storing one or more pending commands received from the firmware 224, transferring a pending command to a corresponding flash memory device, coordinating the status polling of the command as the command is being processed by the flash memory device, and reporting the status of the command to the firmware 224.

In some implementations, the solid state drive 204 (and/or the host 202) may be mounted on a system on-chip (SOC). The SOC, in these implementations, may be fabricated using, for example, a semiconductor process. The SOC may include an embedded process system (e.g., an embedded CPU) separate from that in the solid state drive 204. The SOC also may include a SRAM, system logic, cache memory and cache controller for processing program code and data. The program code and data associated with the embedded process system may be stored in the flash device 206, and communicated to the SOC through, for example, an interface. This interface may be used by a translator (not shown) for translating information flowing between the interface and the internal bus structure of the SOC. Control signals may flow from the SOC to the flash memory devices 206a-206d while instructions and data may flow from the flash memory devices 206a-206d to the SOC during, for example, read operations. Of course, instructions and data also may flow towards the flash memory devices 206a-206d during, for example, erase operations.

Example Process

Figure 4:
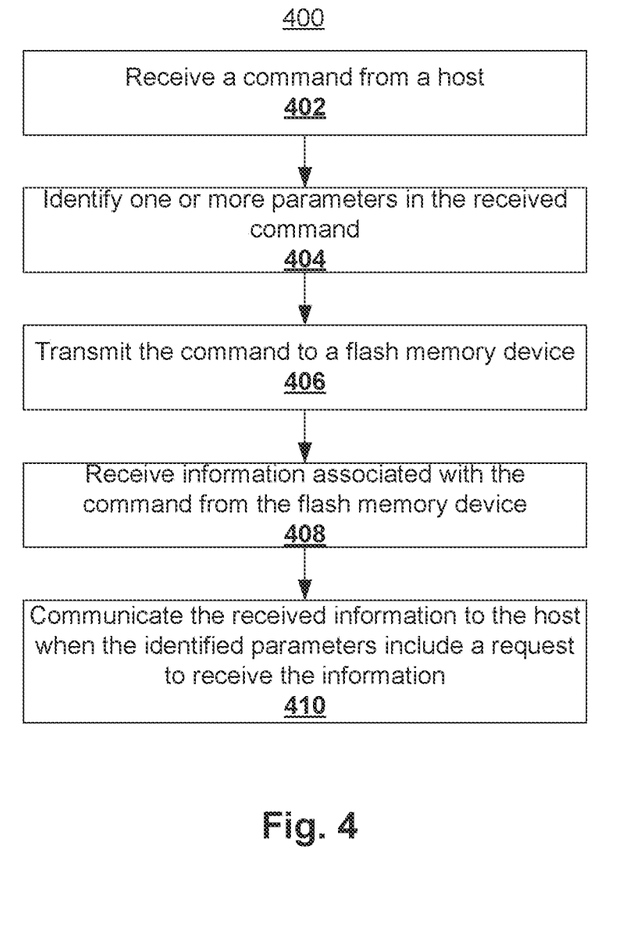
FIG. 4 shows an embodiment of a process for determining whether to communicate information received from one or more flash memory devices to a host.

FIG. 4 is a flow diagram of an embodiment of a process 400 for determining whether to communicate information received from one or more flash memory devices to a host. The process 400 may be performed, for example, by the solid state system 200, and for clarity of presentation, the description that follows uses that system as the basis of examples for describing the process 400. However, another system, or combination of systems, may be used to perform the process 400.

Process 400 begins at 402 with receiving a command from a host. The command may include a read, erase or program service request. Upon receiving the command from the host, at 404, one or more parameters associated with the received command may be identified. In some implementations, the identified parameters may be stored in an internal command queue so that upon receiving information (e.g., status information) from the flash memory device to which the command is to be sent, the stored parameters may be retrieved and examined to determine whether the information received from the flash memory device should be forwarded to the host.

At 406, the command may be transmitted to a flash memory device. Where more than one flash memory devices are provided, the command may include information indicating a particular flash memory device to which the command is to be sent. Once the flash memory device has received the command, the command is processed. In some implementations, the flash memory device may generate information such as status information regarding the execution progress, and forward the information to the host.

In some implementations, the flash memory device may send the information to a sequencer (e.g., sequencer 216) instead of the host. At 408, after receiving the information associated with the command from the flash memory device, at 410, the sequencer may determine whether to communicate the received information to the host. In some implementations, the determination may be based whether the command sent to the flash memory device contains a request from the host to receive the information (e.g., by referencing to the identified parameters stored in the internal command queue). If a request is not included, then the sequencer may forego relaying the information to the host. Conversely, if a request is included, the sequencer may send an interrupt to the host notifying the host of the information received from the flash memory device.

Operations 402-410 may be performed in the order listed, in parallel (e.g., by the same or a different process, substantially or otherwise non-serially), or in reverse order to achieve the same result. In other implementations, operations 402-410 may be performed out of the order shown. For example, one or more parameters from the received command may be identified at 404 after receiving information associated with the command from the flash memory device at 408.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set or instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, of sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
receiving, in a storage device controller from one or more storage devices in a solid state drive system over one or more channels, status information indicating a status of a command processed by the one or more storage devices; and
for the status information received over each of the one or more channels,
determining whether a condition for sending the status information received over the channel to a host device is satisfied, and
sending the status information received over the channel to the host device when the condition for sending the status information is satisfied.

2. The method of claim 1, wherein the condition for sending the status information comprises an error detected in data associated with the status information.

3. The method of claim 1, wherein the condition for sending the status information comprises an error corrected in data associated with the status information.

4. The method of claim 1, wherein the condition for sending the status information comprises a program delay.

5. The method of claim 1, wherein the condition for sending the status information comprises a request to receive the status information included in a command from the host device.

6. The method of claim 1, wherein sending the status information received over the channel to the host device when the condition for sending the status information is satisfied comprises:
sending an interrupt to the host device when the status information is received.

7. The method of claim 1, wherein receiving the status information in the storage device controller from the one or more storage devices in a solid state drive system over one or more channels comprises:
receiving the status information in a hard disk drive controller for controlling one or more hard disks.

8. An apparatus comprising:
circuitry that receives, in a storage device controller from one or more storage devices in a solid state drive system over one or more channels, status information indicating a status of a command processed by the one or more storage devices; and
circuitry that, for the status information received over each of the one or more channels, determines whether a condition for sending the status information received over the channel to a host device is satisfied, and sends the status information received over the channel to the host device when the condition for sending the status information is satisfied.

9. The apparatus of claim 8, wherein the condition for sending the status information comprises an error detected in data associated with the status information.

10. The apparatus of claim 8, wherein the condition for sending the status information comprises an error corrected in data associated with the status information.

11. The apparatus of claim 8, wherein the condition for sending the status information comprises a program delay.

12. The apparatus of claim 8, wherein the condition for sending the status information comprises a request to receive the status information included in a command from the host device.

13. The apparatus of claim 8, wherein the circuitry that sends the status information received over the channel to the host device when the condition for sending the status information is satisfied comprises:
circuitry that sends an interrupt to the host device when the status information is received.

14. The apparatus of claim 8, wherein the solid state drive system comprises a hard disk drive controller for controlling one or more hard disks.

15. A system comprising:
one or more storage devices in a solid state drive system;
a host device; and
a storage device controller coupled with the one or more storage devices and the host device, the storage device controller configured to:

receive, from the one or more storage devices over one or more channels, status information indicating a status of a command processed by the one or more storage devices; and for the status information received over each of the one or more channels,
- determine whether a condition for sending the status information received over the channel to the host device is satisfied, and
- send the status information received over the channel to the host device when the condition for sending the status information is satisfied.

16. The system of claim 15, wherein the condition for sending the status information comprises an error detected in data associated with the status information.

17. The system of claim 15, wherein the condition for sending the status information comprises an error corrected in data associated with the status information.

18. The system of claim 15, wherein the condition for sending the status information comprises a program delay.

19. The system of claim 15, wherein the condition for sending the status information comprises a request to receive the status information included in a command from the host device.

20. The system of claim 15, wherein the storage device controller configured to send the status information received over the channel to the host device when the condition for sending the status information is satisfied comprises:
- the storage device controller configured to send an interrupt to the host device when the status information is received.

21. The system of claim 15, wherein the solid state drive system comprises a hard disk drive controller for controlling one or more hard disks.

* * * * *